UNITED STATES PATENT OFFICE.

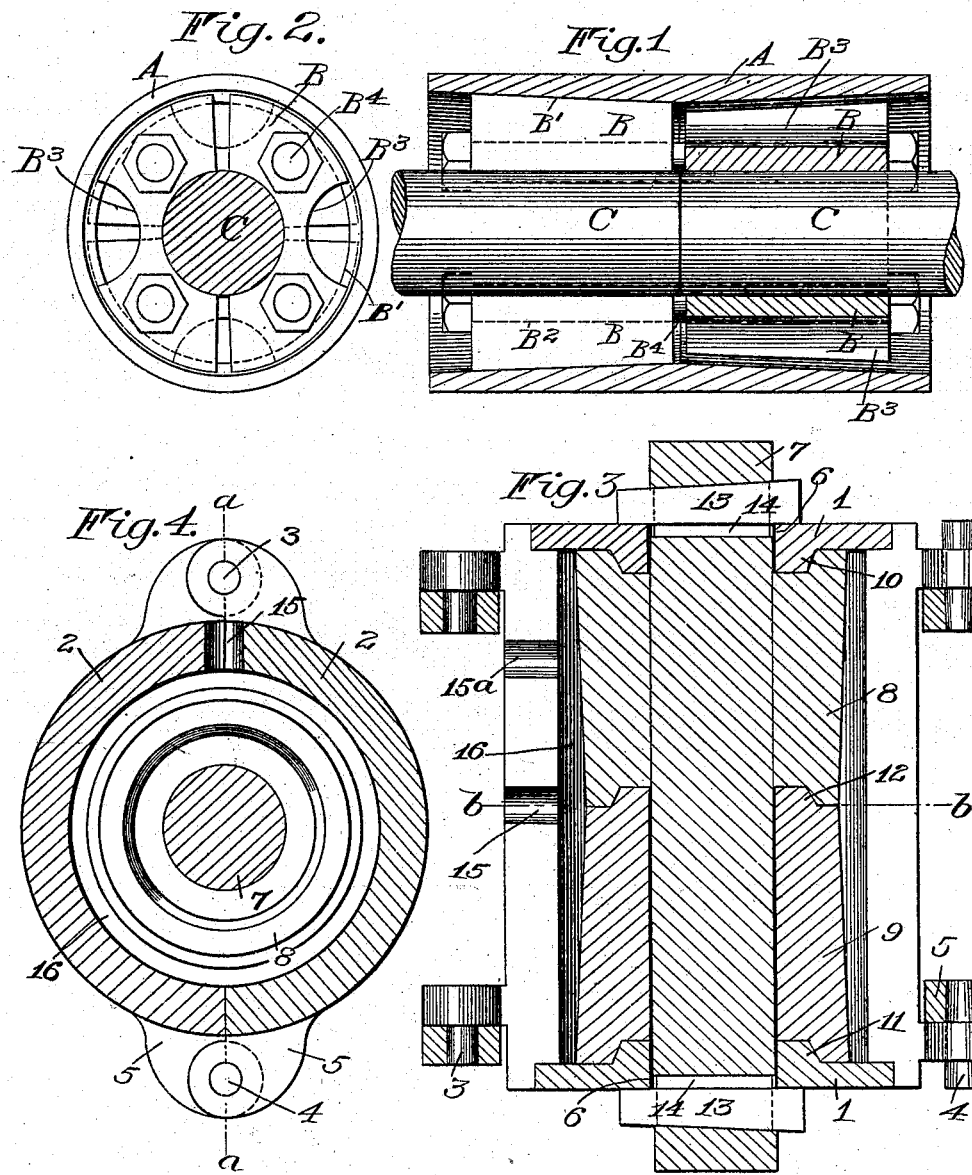

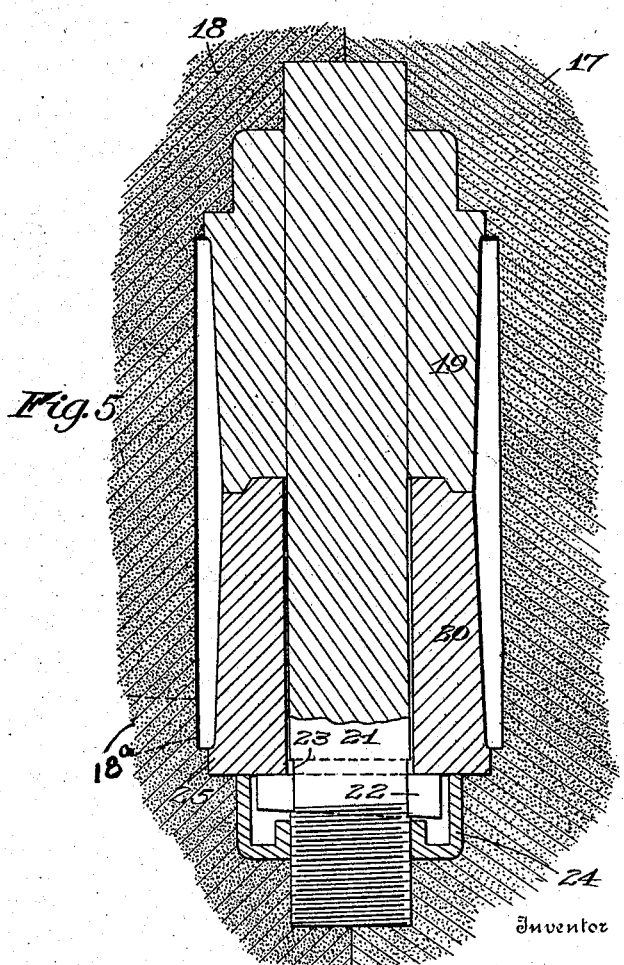

GEORGE S. SEARLE, OF ROCHESTER, NEW YORK.

MOLDING APPARATUS.

No. 918,779.   Specification of Letters Patent.   Patented April 20, 1909.

Application filed May 2, 1907. Serial No. 371,373.

*To all whom it may concern:*

Be it known that I, GEORGE S. SEARLE, of Rochester, in the county of Monroe and State of New York, have invented certain new and useful Improvements in Molding Apparatus; and I do hereby declare the following to be a full, clear, and exact description of the same, reference being had to the accompanying drawings, forming a part of the specification, and to the reference characters marked thereon.

This invention relates to apparatus for molding and has for an object to provide for the formation of curved smooth faces on hollow metallic bodies by casting instead of by the usual machining or milling process, thus reducing the cost of manufacture of such bodies.

To these and other ends the invention consists in certain improvements and combinations of parts all as will be hereinafter more fully described, the novel features being pointed out in the claims at the end of the specification.

In the drawings: Figure 1 is a longitudinal section of a shaft coupling, members of which are formed according to my invention. Fig. 2 is an end view of the coupling. Fig. 3 is a longitudinal horizontal section on the line $a$—$a$ of Fig. 4 of one embodiment of the mold for forming the casing of the coupling. Fig. 4 is a section on line $b$—$b$ of Fig. 3. Fig. 5 is a vertical section through the sand portion of a mold forming another embodiment of the invention.

The parts, as illustrated, are designed for producing coupling elements of the shaft coupling shown in Figs. 1 and 2 and forming the subject matter of a patent granted to me on the 9th day of April, 1907, and numbered 849,860. This coupling comprises an outer hollow casing A having its inner walls tapering inwardly from its ends, and two pairs of segmental jaws B, each pair of which fits about a shaft section C within the casing, the jaws having outer tapering walls B' and being provided with longitudinal bores $B^2$ and with longitudinal grooves $B^3$ in their outer walls. The members of one set of jaws are drawn toward the members of the other set by bolts $B^4$ which pass through the longitudinal bores $B^2$. To separate the couplings, the bolts are removed and a rod or other device is introduced through one of the longitudinal grooves $B^3$ in one set to engage the end of a member of the other set; and, a blow upon the end of the said rod, forces the member from the casing. This loosens the other member of the same set, permitting it to be withdrawn and the other set to be forced from the other end of the casing. In introducing this coupling, I have ascertained that the cost of manufacture can be reduced if machining can be dispensed with, and that the process of casting and chilling increases the tensile strength of the iron and enables me to make a coupling that is tougher and lighter than those now manufactured, as the machining takes off the scale or strongest part of the iron, and for these reasons I have devised the apparatus herein set forth.

In Figs. 3 and 4 is illustrated a mold for forming the casing A. This mold has an outer wall formed with a pour hole 15 and a vent $15^a$ and with a cylindrical inner chilling wall and comprises two end walls 1 and two semi-cylindrical sections 2 hinged at 3 and secured together by taper bolts 4 passing through perforated ears 5 on the sections. The end walls are separate from the hinged sections and are provided with central openings 6 through which passes a core rod 7 of the core that forms the inner wall of the casing A. This core has a chilling face and comprises two sections 8 and 9, arranged end to end and tapering toward their abutting ends or, in other words, toward each other. One of these sections 8 is rigidly secured to the core rod 7, while the other is loosely mounted thereon, and both are held in a central position by tapering bosses 10, 11 and 12, two of which 10 and 11 project from the end walls into recesses in the outer ends of the sections, and the other of which 12 projects from the loosely mounted section into an annular groove in the adjacent end of the rigidly secured section. The end walls of the molds are detachably secured to the mold and to the core rod by wedge pins 13 which pass through transverse slots 14 in the ends of the core rod and engage the end walls. When the parts are in the positions shown, the molten metal is introduced into a pour hole 15 causing the metal to fill the space 16 between the outer circumference of the core and the inner walls of the sections. After the metal has hardened, the sections 2 are separated and the wedges 13 removed, thus permitting the end walls to be taken off and the core rod 7 with its rigidly secured section 8 to be drawn from the end of the casting. When this core section 8 has been driven out of one end of the casting the other section may be engaged at its inner end and driven from the other end of the casting. It will be noted that, in this embodiment, the ends of the casing, as well as the inner and outer walls thereof are chilled, thereby dispensing with milling and producing a coupling element ready for use.

In the embodiment shown in Fig. 5, the mold is formed from sand and has a metallic core, thus causing the chilling of only the inner wall of the casting. The mold in this instance comprises the drag 17, the cope 18 having a pour opening 18$^a$ and a core which is formed of two sections 19 and 20, one (19) being rigidly secured to the core rod 21 and the other (20) being loosely mounted on the rod and held thereon by a wedge 22 passing through an opening 23 in said rod and engaging the end of said section 20. The wedge 22 is covered by a cap 24 having screw threaded engagement with the end of the rod 21. The other end of the core is shaped to simulate the cap and the projecting end of the core, so that the core prints in the mold may be formed the same at each end to permit the core to be dropped into the mold without requiring the molder to place it in the same position every time. Each section is tapered toward the other, as in the other embodiment, and the adjacent end of the rigidly secured section is provided with an annular groove to receive a tapering annular projection on the other section. In addition each section at its outer end has a peripheral projection or flange 25 which forms a portion of an end wall of the mold. After the casting has hardened, the core with the casting is removed from the mold and the screw threaded end of the core rod 9 is given a blow to force the rod, with its rigidly secured section, from the casting, the annular flange 25 on the loosely mounted section, by engaging the end of the casting, acting as a stop to prevent the loosely mounted section being forced into the said casting

I claim as my invention:

1. In a mold, a core comprising a core rod, two sections arranged on the core rod and tapering toward each other, one of said sections being removable, and devices for securing said removable section to the core rod.

2. In a mold, a core comprising a core rod, a tapering core section rigidly secured to the core rod, and a core section tapering toward the tapering end of the other section and removably supported on the core rod.

3. In a mold, a core comprising a core rod, a tapering core section rigidly secured to the core rod and a core section tapering toward the tapering end of the other section and removably supported on the core rod, one of said sections having an annular groove at its abutting end and the other section having a tapering annular projection to fit in the groove.

4. In a mold, the combination of a pair of sections having inner chilling faces, removable end walls, and a core supported by the end walls, and comprising two sections tapering toward each other and devices for securing the core to the end wall.

5. In a mold, the combination of a pair of sections having inner chilling faces, removable end walls, and a core comprising two sections tapering toward each other, and a core rod supported at its ends in the end walls and rigidly secured to one section and extending through the other section.

6. In a mold, a pair of sections having inner chilling faces, removable end walls having openings; a core comprising a core rod supported in the openings and provided with transverse slots, and a pair of sections tapering toward each other, one being rigidly secured to the core rod and the other being detachably secured thereto; and wedge pins passing through the transverse slots and holding the sections to the end walls.

7. In a mold, a pair of hinged sections having inner chilling faces, removable end walls having inwardly extending tapering bosses and central openings, a core rod secured in said openings, and core sections tapering toward each other, one being secured to the core rod and the other being removably supported thereon, said core sections having recesses at their outer ends to fit the tapering bosses on the end walls of the mold.

GEORGE S. SEARLE.

Witnesses:
HENRY W. HALL,
H. H. SIMMS.